(12) United States Patent
Aoyama et al.

(10) Patent No.: US 8,680,739 B2
(45) Date of Patent: Mar. 25, 2014

(54) ROTARY ELECTRICAL MACHINE

(75) Inventors: Yasuaki Aoyama, Hitachinaka (JP);
Takafumi Koseki, Mitaka (JP)

(73) Assignees: Hitachi, Ltd., Tokyo (JP); The University of Tokyo, Tokyo (JP)

( * ) Notice: Subject to any disclaimer, the term of this patent is extended or adjusted under 35 U.S.C. 154(b) by 225 days.

(21) Appl. No.: 12/942,143

(22) Filed: Nov. 9, 2010

(65) Prior Publication Data

US 2011/0109190 A1      May 12, 2011

(30) Foreign Application Priority Data

Nov. 9, 2009   (JP) .................................. 2009-255821

(51) Int. Cl.
*H02K 1/06*      (2006.01)
*H02K 1/12*      (2006.01)

(52) U.S. Cl.
USPC ...... 310/216.074; 310/216.023; 310/216.024; 310/216.026; 310/216.027; 310/216.028; 310/216.033; 310/216.034

(58) Field of Classification Search
USPC .................... 310/216.074, 216.023, 216.024, 310/216.026, 216.027, 216.028, 216.033, 310/216.034
See application file for complete search history.

(56) References Cited

U.S. PATENT DOCUMENTS

| | | | | |
|---|---|---|---|---|
| 3,803,433 A | * | 4/1974 | Ingenito | 310/156.35 |
| 3,869,627 A | * | 3/1975 | Ingenito et al. | 310/162 |
| 4,237,396 A | * | 12/1980 | Blenkinsop et al. | 310/154.06 |
| 5,179,307 A | * | 1/1993 | Porter | 310/68 B |
| 5,289,072 A | * | 2/1994 | Lange | 310/266 |
| 5,365,137 A | * | 11/1994 | Richardson et al. | 310/216.039 |
| 5,396,140 A | * | 3/1995 | Goldie et al. | 310/268 |
| 5,656,880 A | * | 8/1997 | Clark | 310/268 |
| 5,729,065 A | * | 3/1998 | Fremery et al. | 310/90.5 |

(Continued)

FOREIGN PATENT DOCUMENTS

| | | |
|---|---|---|
| CA | 990336 | 6/1976 |
| JP | 09-117116 | 5/1997 |

(Continued)

OTHER PUBLICATIONS

Office Action issued in Japanese Patent Application No. 2009-255821 on Jun. 18, 2013.

*Primary Examiner* — Tran Nguyen
*Assistant Examiner* — Alex W Mok
(74) *Attorney, Agent, or Firm* — Antonelli, Terry, Stout & Kraus, LLP.

(57) ABSTRACT

When a conventional technology is employed, it is difficult to manufacture a magnet row because magnets are disposed so that N-poles face each other while S-poles face each other. Further, magnetic reluctance is increased because a generated magnetic flux obliquely crosses an air gap in which the magnets are disposed. Furthermore, the conventional technology is at a disadvantage in that magnetic flux interference occurs between neighboring magnetic poles. The present invention has been made to address the above problems and provide a rotary electrical machine capable of generating high torque at low speed. The rotary electrical machine includes a rotor disc and an armature. The rotor disc is configured so that plural rectangular magnets whose longitudinal direction crosses the direction of rotor disc rotation are disposed on the rotor disc, and that the polarities of neighboring magnets differ from each other. The armature is configured so that plural armature cores are disposed to sandwich the magnets, which are mounted on the rotor disc and provided with a particular magnetic pole, and that a winding is commonly wound between the armature cores.

6 Claims, 14 Drawing Sheets

(56) References Cited

U.S. PATENT DOCUMENTS

| | | | | |
|---|---|---|---|---|
| 5,731,649 A * | 3/1998 | Caamano | ............... | 310/216.047 |
| 5,773,910 A * | 6/1998 | Lange | ............... | 310/266 |
| 5,814,914 A * | 9/1998 | Caamano | ............... | 310/216.047 |
| 5,886,449 A * | 3/1999 | Mitcham | ............... | 310/216.001 |
| 5,903,082 A * | 5/1999 | Caamano | ............... | 310/216.001 |
| 5,973,436 A * | 10/1999 | Mitcham | ............... | 310/266 |
| 5,982,070 A * | 11/1999 | Caamano | ............... | 310/216.047 |
| 5,986,378 A * | 11/1999 | Caamano | ............... | 310/216.047 |
| 6,028,377 A * | 2/2000 | Sakamoto | ............... | 310/12.17 |
| 6,043,579 A * | 3/2000 | Hill | ............... | 310/164 |
| 6,097,118 A * | 8/2000 | Hull | ............... | 310/74 |
| 6,154,013 A * | 11/2000 | Caamano | ............... | 322/89 |
| 6,259,233 B1 * | 7/2001 | Caamano | ............... | 322/89 |
| 6,717,313 B1 * | 4/2004 | Bae | ............... | 310/156.08 |
| 6,741,010 B2 * | 5/2004 | Wilkin | ............... | 310/268 |
| 6,882,066 B2 * | 4/2005 | Kastinger | ............... | 310/49.08 |
| 6,897,595 B1 * | 5/2005 | Chiarenza | ............... | 310/216.043 |
| 6,930,433 B2 * | 8/2005 | Bales et al. | ............... | 310/268 |
| 7,034,425 B2 * | 4/2006 | Detela | ............... | 310/162 |
| 7,067,950 B2 * | 6/2006 | Hirzel et al. | ............... | 310/216.094 |
| 7,164,220 B2 * | 1/2007 | Gilmour et al. | ............... | 310/266 |
| 7,180,216 B2 * | 2/2007 | Hirzel et al. | ............... | 310/168 |
| 7,230,361 B2 * | 6/2007 | Hirzel | ............... | 310/216.074 |
| 7,332,846 B2 * | 2/2008 | Hill | ............... | 310/266 |
| 7,372,185 B2 * | 5/2008 | Hirzel et al. | ............... | 310/216.004 |
| 7,432,623 B2 * | 10/2008 | Ritz et al. | ............... | 310/156.36 |
| 7,868,510 B2 * | 1/2011 | Rittenhouse | ............... | 310/216.069 |
| 8,253,299 B1 * | 8/2012 | Rittenhouse | ............... | 310/257 |
| 8,354,768 B2 * | 1/2013 | Cipriani | ............... | 310/209 |
| 2002/0047346 A1 * | 4/2002 | Miekka et al. | ............... | 310/68 B |
| 2002/0125781 A1 * | 9/2002 | Bales | ............... | 310/156.35 |
| 2002/0175582 A1 * | 11/2002 | Lopatinsky et al. | ..... | 310/156.01 |
| 2003/0025408 A1 * | 2/2003 | Miekka et al. | ............... | 310/68 R |
| 2004/0207281 A1 * | 10/2004 | Detela | ............... | 310/162 |
| 2005/0099081 A1 * | 5/2005 | Obidniak | ............... | 310/156.36 |
| 2005/0179337 A1 * | 8/2005 | Hasebe et al. | ............... | 310/268 |
| 2005/0212381 A1 * | 9/2005 | Gilmour et al. | ............... | 310/266 |
| 2007/0152528 A1 * | 7/2007 | Kang et al. | ............... | 310/156.55 |
| 2008/0211326 A1 * | 9/2008 | Kang et al. | ............... | 310/44 |
| 2008/0272666 A1 * | 11/2008 | Halstead | ............... | 310/156.36 |
| 2009/0309463 A1 * | 12/2009 | Ritz et al. | ............... | 310/68 B |
| 2009/0322165 A1 * | 12/2009 | Rittenhouse | ............... | 310/43 |
| 2010/0072850 A1 * | 3/2010 | Miyata et al. | ............... | 310/156.12 |

FOREIGN PATENT DOCUMENTS

| | | | | |
|---|---|---|---|---|
| JP | 9-117116 | | 5/1997 | |
| JP | 2009-247180 | | 10/2009 | |
| JP | 2010-141978 | | 6/2010 | |
| JP | 47-10964 | | 6/2011 | |
| WO | WO 87/02525 | | 4/1987 | |
| WO | WO 2008047461 A1 * | | 4/2008 | ............ H02K 41/03 |
| WO | WO 2009001917 A1 * | | 12/2008 | |
| WO | WO 2009093181 A2 * | | 7/2009 | |

* cited by examiner (a)

(b)

(c)

(d)

(a)

(b)

(c)

(d)

ROTARY ELECTRICAL MACHINE

CLAIM OF PRIORITY

The present application claims priority from Japanese Patent application serial no. 2009-255821, filed on Nov. 9, 2009, the content of which is hereby incorporated by reference into this application.

FIELD OF THE INVENTION

The present invention relates to a rotary electrical machine that decreases the spacing interval between neighboring magnetic poles, provides low-speed, high-torque drive, and reduces torque ripple.

BACKGROUND OF THE INVENTION

In a conventional rotary electrical machine having a sandwiched rotor, magnets are disposed in such a manner that N-poles face each other while S-poles face each other, as described in JP-A No. 117116/1997. Further, the magnets face each other while they are sandwiched between stator cores. A spiral magnetic flux is generated in a magnetic circuit including a stator core so that oblique magnetic flux linkage occurs in relation to a magnet.

When a conventional technology is employed, it is difficult to manufacture a magnet row because magnets are disposed in such a manner that N-poles face each other while S-poles face each other. Further, magnetic reluctance is increased because a generated magnetic flux obliquely crosses a air gap in which the magnets are disposed. Furthermore, the conventional technology is at a disadvantage in that magnetic flux interference occurs between neighboring magnetic poles.

The present invention has been made in view of the above circumstances and provides a rotary electrical machine capable of generating high torque at low speed.

SUMMARY OF THE INVENTION

According to a first aspect of the present invention, there is provided a rotary electrical machine including a rotor disc and an armature. The rotor disc is configured in such a manner that plural rectangular magnets whose longitudinal direction crosses the direction of rotation are disposed on the rotor disc, and that the polarities of neighboring magnets differ from each other. The armature is configured in such a manner that plural armature cores are disposed to sandwich the magnets, which are mounted on the rotor disc and provided with a particular magnetic pole, and that a winding is commonly wound between the armature cores.

According to a second aspect of the present invention, there is provided the rotary electrical machine as described in the first aspect, in which the armature cores each include upper and lower magnetic pole teeth, which are respectively positioned above and below the rotor disc, and a core portion, which joins the upper and lower magnetic pole teeth. The magnetic pole teeth may be formed in the longitudinal direction of the magnets.

According to a third aspect of the present invention, there is provided the rotary electrical machine as described in the first aspect, in which the armature cores each include upper and lower magnetic pole teeth, which are respectively positioned above and below the rotor disc, and a core portion, which joins the upper and lower magnetic pole teeth. The winding, which is commonly wound between the armature cores, is provided for the core portion.

According to a fourth aspect of the present invention, there is provided the rotary electrical machine as described in the first aspect, in which the armature cores each include upper and lower magnetic pole teeth, which are respectively positioned above and below the rotor disc, and a core portion, which joins the upper and lower magnetic pole teeth. The winding, which is commonly wound between the armature cores, is commonly provided for the upper and lower magnetic pole teeth, which are respectively positioned above and below the rotor disc.

According to a fifth aspect of the present invention, there is provided a rotary electrical machine including a rotor disc and an armature. The rotor disc is configured in such a manner that plural rectangular magnets whose longitudinal direction crosses the direction of rotation are disposed on the rotor disc, and that the polarities of neighboring magnets differ from each other. The armature is configured in such a manner that plural armature cores are disposed to sandwich the magnets on the rotor disc, and that a winding is commonly wound between the armature cores. When the angle formed by the neighboring magnets on the rotor disc is $\theta$, the angle formed by the armature cores is $2\theta$.

According to a sixth aspect of the present invention, there is provided a rotary electrical machine including a rotor disc and an armature. The rotor disc is configured in such a manner that plural rectangular magnets whose longitudinal direction crosses the direction of rotation are disposed on the rotor disc, and that the polarities of neighboring magnets differ from each other. The armature is configured in such a manner that plural armature cores are disposed to sandwich the magnets on the rotor disc, and that a winding is commonly wound between the armature cores. When the angle formed by the neighboring magnets on the rotor disc is $\theta$ and the symbol n represents an arbitrary harmonic number, the angle formed by the armature cores is $2\theta \pm \theta/n$.

According to a seventh aspect of the present invention, there is provided a rotary electrical machine including a rotor disc and an armature. The rotor disc is configured in such a manner that plural rectangular magnets whose longitudinal direction crosses the direction of rotation are disposed on the rotor disc, and that the polarities of neighboring magnets differ from each other. The armature is configured in such a manner that plural armature cores are disposed to sandwich the magnets, which are mounted on the rotor disc and provided with a particular magnetic pole, and that a winding is commonly wound between the armature cores. The armature cores each include upper and lower magnetic pole teeth, which are respectively positioned above and below the rotor disc, and a core portion, which joins the upper and lower magnetic pole teeth. The magnetic pole teeth are formed in the longitudinal direction of the magnets.

According to an eighth aspect of the present invention, there is provided the rotary electrical machine as described in the seventh aspect, in which an air gap between the magnetic pole teeth and the magnets is configured in such a manner that the air gap formed by the leading ends of the magnetic pole teeth is smaller than the air gap formed by the core side of the magnetic pole teeth.

According to a ninth aspect of the present invention, there is provided the rotary electrical machine as described in the seventh aspect, in which a portion of the magnetic pole teeth that is close to the magnets on the rotor disc is thin.

According to a tenth aspect of the present invention, there is provided the rotary electrical machine as described in the seventh aspect, in which surfaces of the magnetic pole teeth that face the magnets are shaped to match the rectangular shapes of the magnets.

According to an eleventh aspect of the present invention, there is provided a rotary electrical machine including a rotor disc and an armature. The rotor disc is configured in such a manner that plural rectangular magnets whose longitudinal direction crosses the direction of rotation are disposed on the rotor disc, and that the polarities of neighboring magnets differ from each other. The armature is configured in such a manner that plural armature cores are disposed to sandwich the magnets, which are mounted on the rotor disc and provided with a particular magnetic pole, and that a winding is commonly wound between the armature cores. The armature cores each include upper and lower magnetic pole teeth, which are respectively positioned above and below the rotor disc, and a core portion, which joins the upper and lower magnetic pole teeth. An auxiliary core is provided between neighboring magnetic pole teeth of the armature cores.

According to a twelfth aspect of the present invention, there is provided a rotary electrical machine including a rotor disc and an armature. The rotor disc is configured in such a manner that plural rectangular magnets whose longitudinal direction crosses the direction of rotation are disposed on the rotor disc, and that the polarities of neighboring magnets differ from each other. The armature includes plural armature cores that are disposed to sandwich the magnets, which are mounted on the rotor disc and provided with a particular magnetic pole, and a winding that is commonly wound between the armature cores. The armature is placed at different positions and provided independently for each phase.

As an embodiment of the present invention makes it possible to reduce magnetic flux leakage, the spacing intervals between the magnets can be decreased to obtain a high-torque rotary electrical machine.

DETAILED DESCRIPTION OF THE INVENTION

Embodiments of the present invention will now be described.

Figure 1:
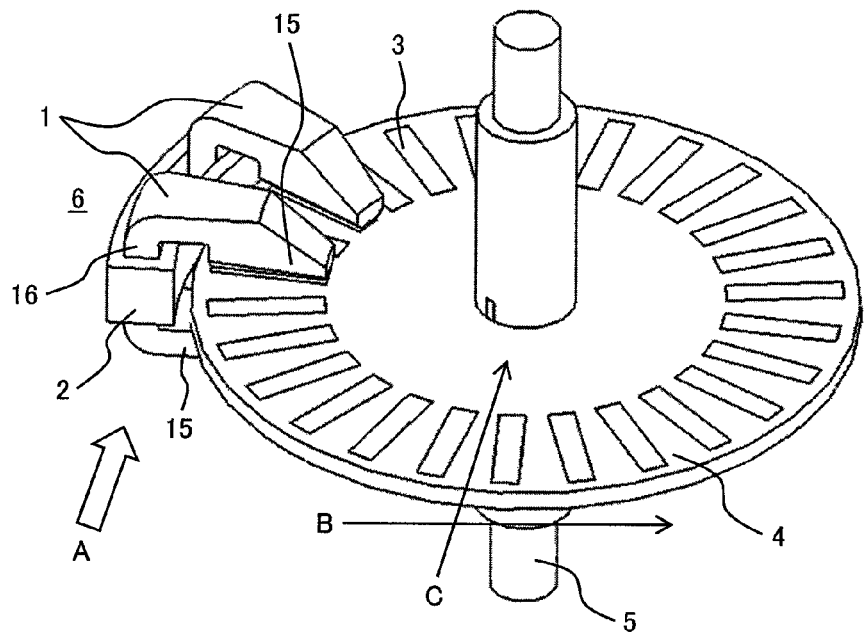
FIG. 1 is a diagram illustrating an example configuration of a rotary electrical machine according to an embodiment of the present invention.

FIG. 1 shows an example basic configuration of a rotary electrical machine according to an embodiment of the present invention. The rotary electrical machine shown in FIG. 1 includes a shaft 5, a disc-shaped rotor 4 whose center is fastened to the shaft 5, and an armature 6 configured to sandwich the disc-shaped rotor 4. Plural magnets 3 are mounted on the periphery of the disc-shaped rotor 4. The armature 6 includes plural armature cores 1, which are disposed to sandwich the magnets 3 mounted on the periphery of the disc-shaped rotor 4, and a winding 2, which is commonly provided for the armature cores 1. When the armature 6 is viewed in the direction of arrow A in FIG. 1, each of the armature cores 1 is obviously shaped like the letter C, and includes a core portion 16 that joins a magnetic pole tooth 15 above the front surface of the rotor 4 and a magnetic pole tooth 15 beneath the back surface of the rotor 4 (only a part of it is shown in FIG. 1). The winding 2 is commonly provided between the core portions 16 of the armature cores 1.

In the structure of the rotary electrical machine, the disc-shaped rotor 4 is a so-called rotor disc. It can be said that plural rectangular magnets (including oblong, trapezoidal, many-sided, or substantially rhombic magnets as described later) are arranged in the direction of arrow C, which crosses the direction of rotor rotation (arrow B in FIG. 1). Although various forms of the rotor disc according to an embodiment of the present invention are depicted subsequently, plural rectangular magnets are always arranged in a direction that crosses the direction of rotor disc rotation.

Figure 2:
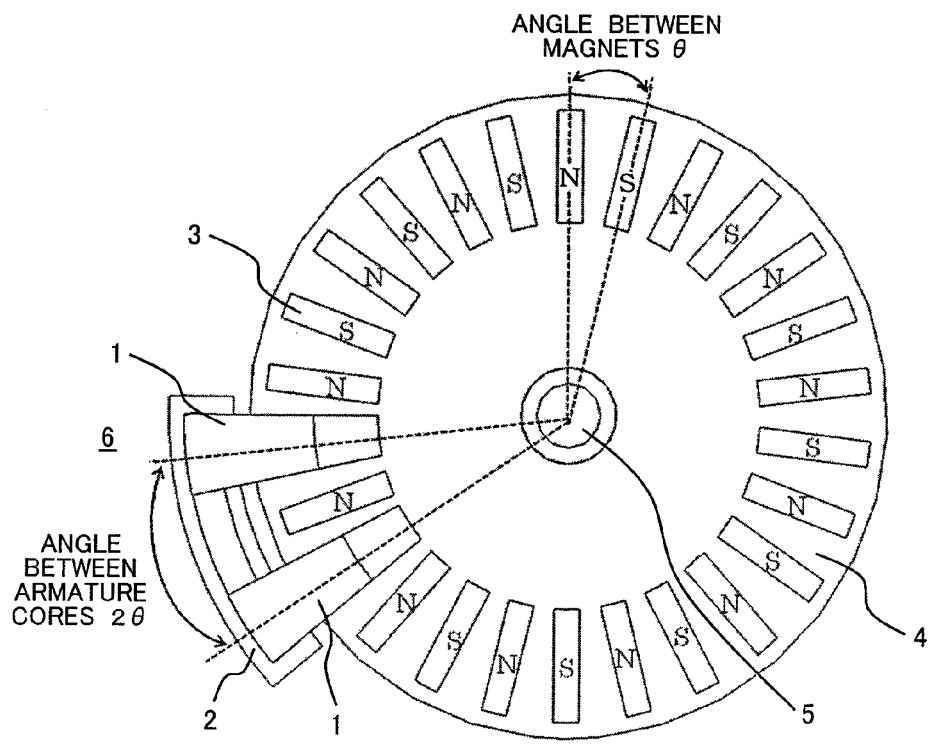
FIG. 2 is a view of the rotary electrical machine of FIG. 1 taken in the direction of a shaft 5.

FIG. 2 is a view of the rotary electrical machine of FIG. 1 taken in the direction of the shaft 5. The magnets 3 disposed on the rotor 4 are magnetized in the axial direction of the shaft 5. When viewed from the above, the magnets are arranged in such a manner that neighboring magnet poles alternate between N- and S-poles. The magnets 3 are spaced at equal angles. The angle formed by neighboring magnets 3 relative to the center of the disc-shaped rotor 4 is θ.

In the example shown in FIG. 2, two armature cores 1 are integral with the common winding 2 to form the armature 6. The angle formed by the two armature cores 1 relative to the center of the disc-shaped rotor 4 is approximately 2θ when the aforementioned angle between neighboring magnets is θ. Therefore, when one of the two armature cores 1 sandwiches an S-pole magnet, the other armature core 1 sandwiches another S-pole magnet, which is two positions away from the former one.

The armature cores 1, which form a respective pole, are formed separately, and the angle 2θ between the armature cores can be changed. Torque control and torque ripple control can be exercised by changing the angle between the armature cores as described in detail later. Although FIG. 2 shows the arrangement of the armature cores 1 in a single-phase configuration, a multi-phase drive system can be implemented when plural armature cores and windings are disposed to provide multiple phases, which are electrically different from each other.

The rotary electrical machine according to an embodiment of the present invention, which has been described with reference to FIGS. 1 and 2, is also characterized by the structure of the armature 6. More specifically, the armature 6 is structured in such a manner that the common winding 2 is disposed between the plural C-shaped armature cores 1 (two armature cores in the example shown in FIGS. 1 and 2), which are formed to sandwich the magnets 3, and that the armature cores 1 are positioned above magnets having the same polarity.

The above configuration reduces magnetic flux leakage because the direction of the magnetic flux in a magnetic path formed by the armature cores 1 and magnets shown in FIGS. 1 and 2 remains constant. Consequently, the spacing intervals between the magnets can be reduced to obtain high torque.

Figure 3:
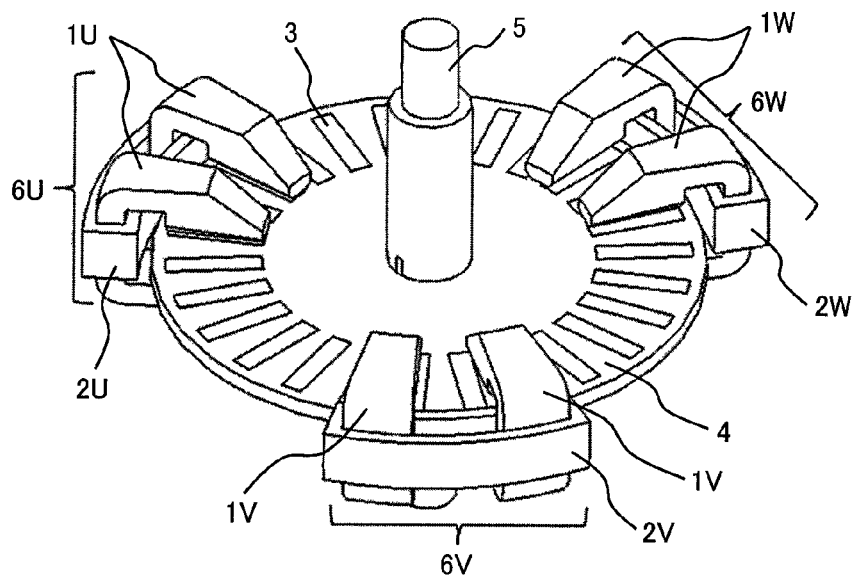
FIG. 3 is a diagram illustrating a three-phase drive configuration of the rotary electrical machine of FIG. 1.

FIG. 3 shows the layout of armature cores and windings in a three-phase drive configuration of the rotary electrical machine of FIG. 1. U-, V-, and W-phase armatures 6U, 6V, 6W are disposed to sandwich the disc-shaped rotor 4. In this instance, rotational drive can be provided with a three-phase alternating current because the U-, V-, and W-phase armatures 6U, 6V, 6W are spaced at an electrical angle of 120 degrees. Although FIG. 3 indicates that the individual phases are spaced at substantially equal mechanical intervals, the core portions and windings of the armature cores of various phases can be positioned closer to each other or repositioned to air gap interference.

The rotary electrical machine shown in FIG. 3 includes the rotor disc and armatures. The rotor disc is configured in such a manner that plural rectangular magnets whose longitudinal direction crosses the direction of rotation are disposed on the rotor disc, and that the polarities of neighboring magnets differ from each other. The armatures each include plural armature cores that are disposed to sandwich the magnets, which are mounted on the rotor disc and provided with a particular magnetic pole, and a winding that is commonly wound between the armature cores. The armatures are placed at different positions and provided independently for individual phases.

Figure 4:
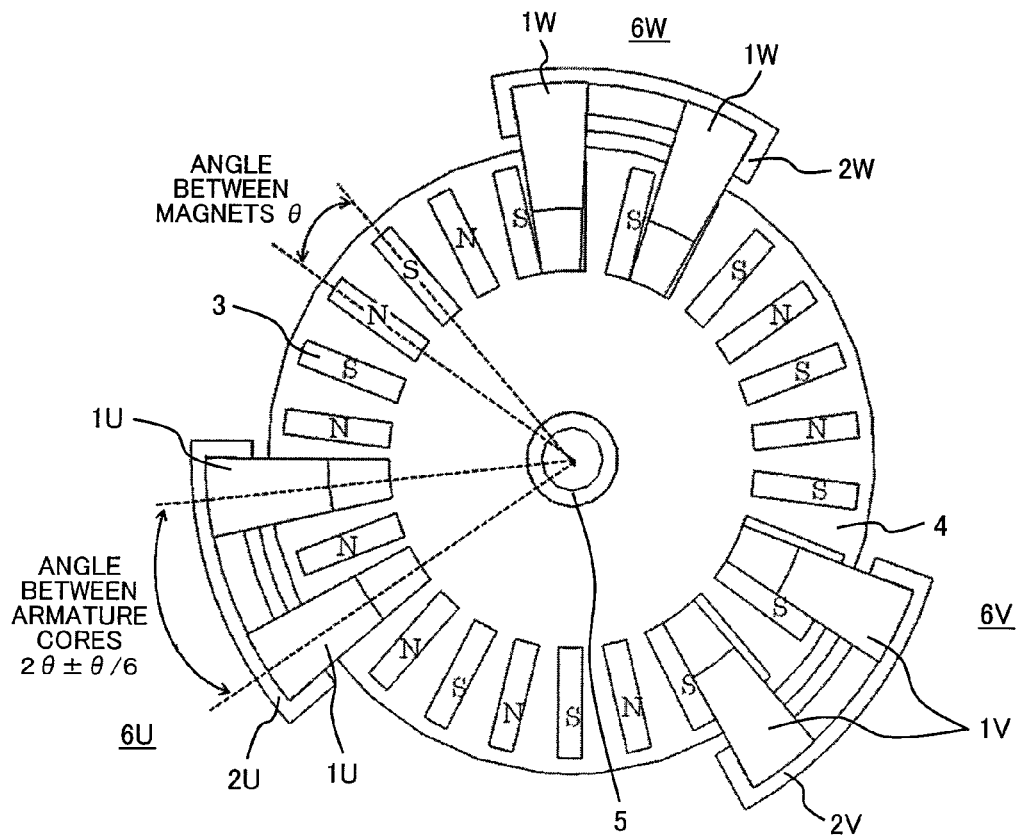
FIG. 4 is a view of the rotary electrical machine of FIG. 3 taken in the direction of a shaft 5.

FIG. 4 is a view of the three-phase rotary electrical machine of FIG. 3 taken in the direction of the shaft 5. An example armature core arrangement for offsetting sixth-order torque ripple during three-phase drive will now be described with reference to FIG. 4. The armatures 6U, 6V, 6W of different phases are disposed in such a manner that they are spaced at an electrical angle of 120 degrees. The armature cores 1U, 1V, 1W for the armatures of different phases have two poles. When the angle between the magnets is θ, it is assumed that the angle formed by two armature cores relative to the center (shaft 5) (the angle between the armature cores) is 2θ+θ/6 or 2θ−θ/6. This configuration enables two cores having different polarities to offset pulsatile components and reduce torque ripple.

Referring to FIG. 4, the U-phase armature cores 1U are spaced at an angle of 2θ±θ/6 to form the U-phase armature. The V-phase and W-phase are configured in the same manner as for the U-phase so that their armature cores are spaced at an angle of 2θ±θ/6. In this manner, torque ripple can be reduced by changing the angle between the cores. Control can also be exercised to obtain an arbitrary torque pattern. Further, torque ripple of a different order can also be reduced by disposing plural armature cores.

Figure 5:
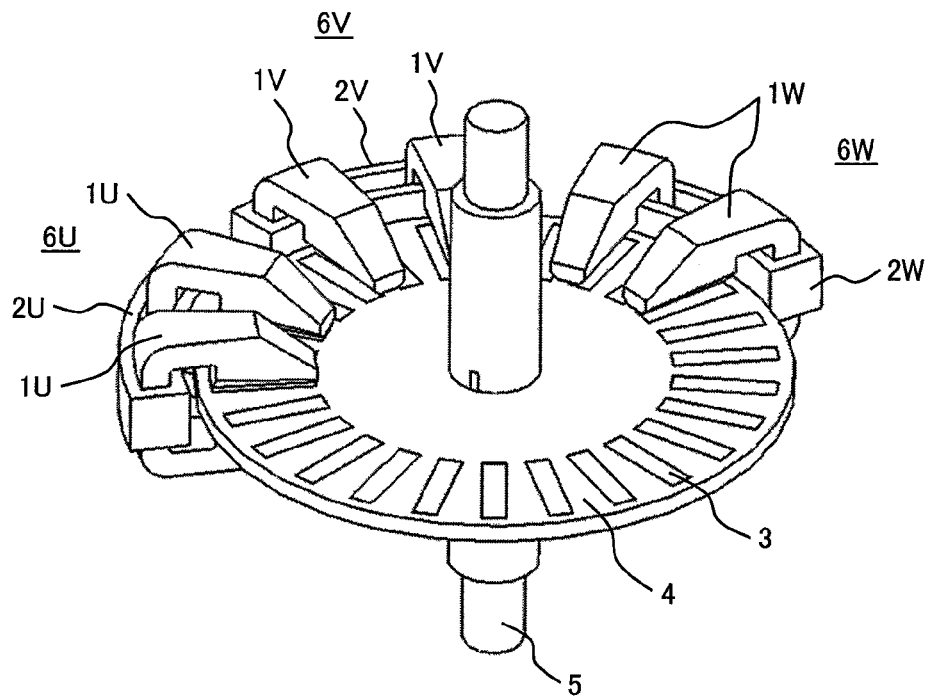
FIG. 5 is a diagram illustrating the three-phase drive configuration of FIG. 3 in which an alternative armature arrangement is employed.

FIG. 5 is a diagram illustrating the three-phase drive configuration of FIG. 3 in which an alternative arrangement is employed for the armatures 6U, 6V, 6W. The positions of the armatures can be arbitrarily changed as far as a phase difference of 120 degrees is electrically maintained. In the example shown in FIG. 5, the armatures 6U, 6V, 6W are concentrically disposed in a rear region to leave a front region unoccupied. Therefore, another mechanism (e.g., a controller for the rotary electrical machine) can be placed in the unoccupied front region to reduce the overall size of the rotary electrical machine.

Figure 6:
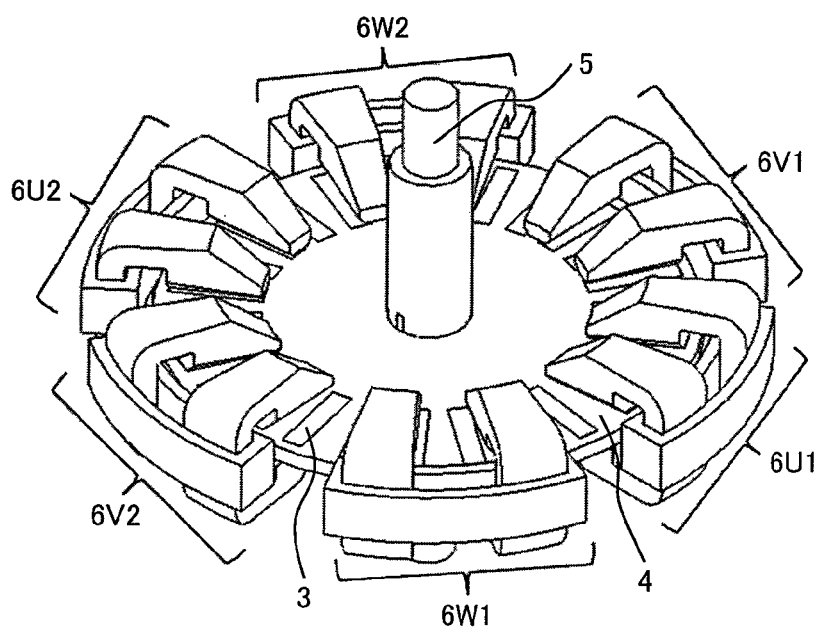
FIG. 6 is a diagram illustrating an armature arrangement in which each of three phases is divided into two opposing sets.

FIG. 6 shows an example in which the armatures 6U, 6V, 6W of different phases are respectively divided into two opposing sets (6U1 and 6U2, 6V1 and 6V2, and 6W1 and 6W2). In this example, the armatures are balanced because the armatures of the same phase (e.g., 6U1 and 6U2) face each other. As described above, the positions of the armatures and the number of poles can be changed depending on the use and characteristics.

For the armatures of the rotary electrical machine according to the foregoing embodiments of the present invention, the winding to be provided between the plural C-shaped armature cores is disposed at a core portion (16 in FIG. 1) of an armature core. In the subsequent embodiments, however, the winding is directly disposed at a portion that forms magnet-opposing magnetic pole teeth.

Figure 7:
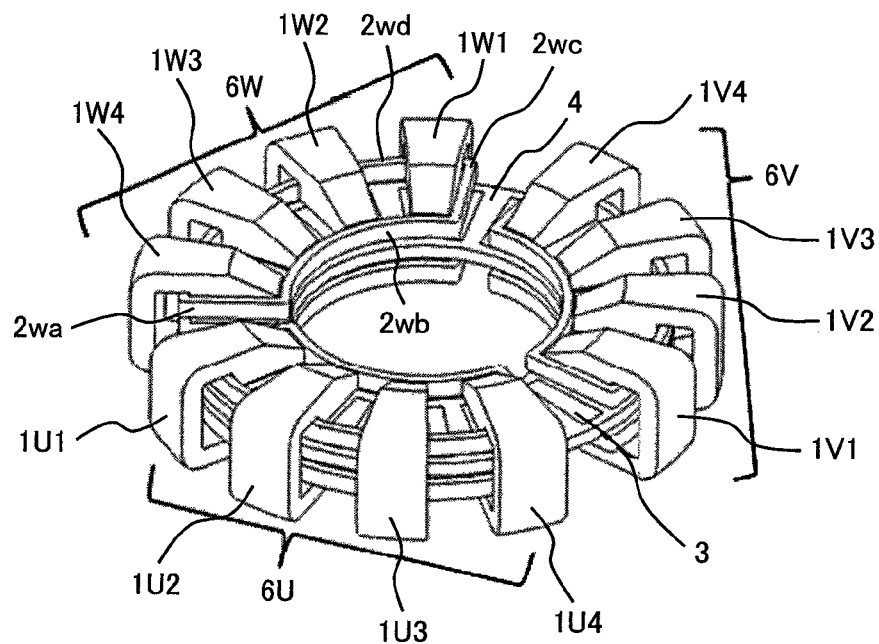
FIG. 7 is a diagram illustrating a direct winding for magnetic pole teeth of opposing magnets.

In the example shown in FIG. 7, the armatures 6U, 6V, 6W of different phases each include four poles (the armature 6U, for example, includes four armature cores 1U1, 1U2, 1U3, 1U4). Referring to FIG. 7, the winding 2 is wound, for instance, around the armature 6W in such a manner as to circulate from a lateral portion 2Wa of the armature core 1W4 through a leading end portion 2Wb of the four armature cores (a portion forming the magnet-opposing magnetic pole teeth), a lateral portion 2Wc of the armature core 1W1 to a core side portion 2Wd of the four armature cores. This configuration makes it possible to obtain higher torque than when the winding is provided on the core portion 16.

Figure 8:
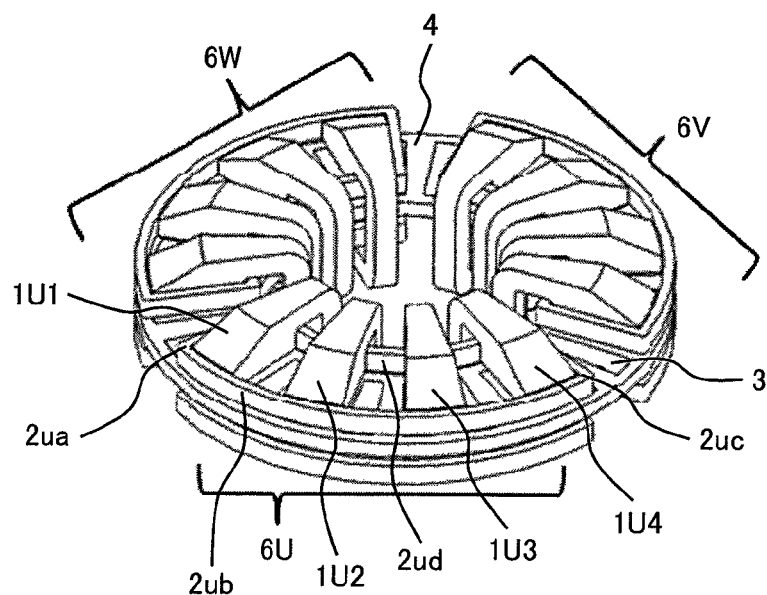
FIG. 8 is a diagram illustrating a rotary electrical machine in which an armature 6 is supported from the inside of a rotor 4.

FIG. 8 shows the rotary electrical machine in which the armatures 6 are supported from the inside of the rotor 4. It this case, too, it is assumed that the winding is directly disposed at a portion that forms magnet-opposing magnetic pole teeth. As is the case with the armatures shown in FIG. 7, the armatures 6U, 6V, 6W of different phases shown in FIG. 8 each include four poles (the armature 6U, for example, includes four armature cores 1U1, 1U2, 1U3, 1U4). Referring to FIG. 8, the winding 2 is wound, for instance, around the armature 6U in such a manner as to circulate from a lateral portion 2Ua of the armature core 1U1 through a leading end portion 2Ub of the four armature cores (a portion forming the magnet-opposing magnetic pole teeth), a lateral portion 2Uc of the armature core 1U4 to a core side portion 2Ud of the four armature cores.

When the rotary electrical machine is configured in such a manner that the armatures 6 are supported from the inside of the rotor 4 as shown in FIG. 8, the shaft cannot be disposed at the center. Therefore, torque is obtained from the periphery.

Figure 9:
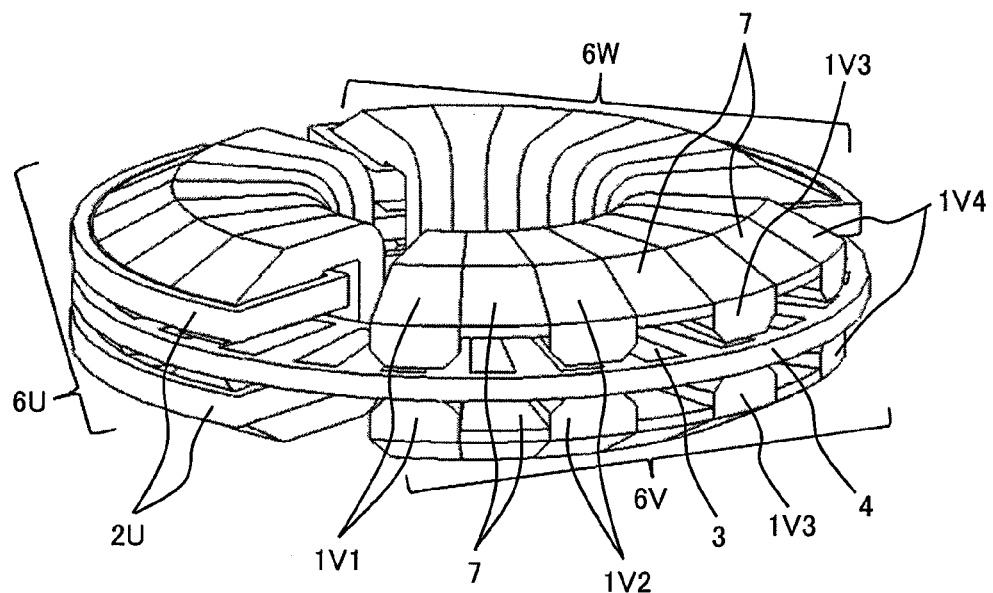
FIG. 9 is a diagram illustrating an example of a rotary electrical machine having an auxiliary core 7.

FIG. 9 is a diagram illustrating an example of the rotary electrical machine having an auxiliary core 7. The rotary electrical machine shown in FIG. 9 is configured in such a manner that the armatures 6 are supported from the inside of the rotor 4. In FIG. 9, the winding for the V-phase armature 6V (which corresponds to the winding 2U for the U-phase armature) is removed for the explanation of the auxiliary core 7. The angle between neighboring V-phase armature cores 1V (1V1 and 1V2) is substantially two times the angle between the magnets. The auxiliary core 7 is disposed between the V-phase armature cores 1V (1V1 and 1V2). Similarly, the auxiliary core 7 is disposed between the V-phase armature cores 1V2 and 1V3 and between the V-phase armature cores 1V3 and 1V4. The auxiliary core 7 reduces the magnetic reluctance in a magnetic circuit. Further, a portion of the auxiliary core 7 that opposes a magnet is removed. This ensures that ineffective magnetic flux will not be acquired.

Figure 10:
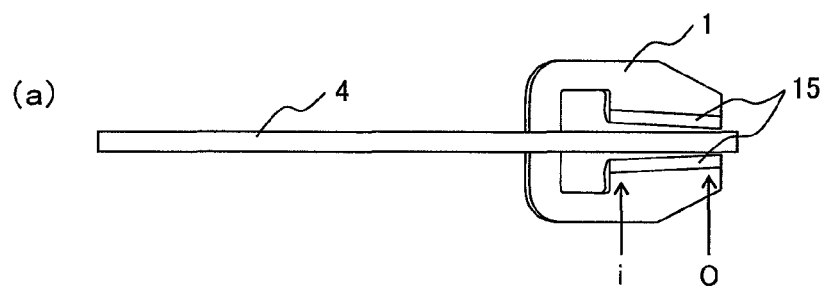
FIGS. 10A and 10B are diagrams illustrating inclined tooth tops 15 (magnetic pole teeth) of an armature core 1 that oppose the rotor 4.
Figure 10:
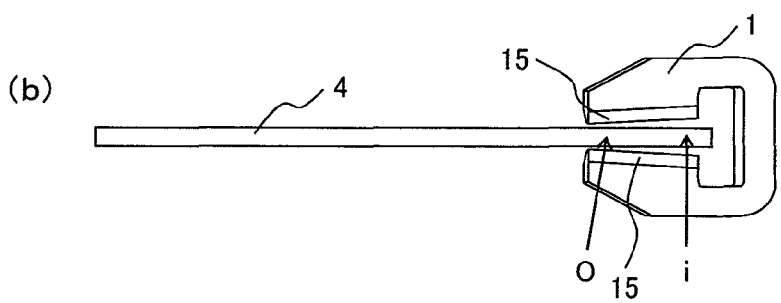

FIGS. 10A and 10B show examples of inclined tooth tops 15 (magnetic pole teeth) of an armature core 1 that oppose the rotor 4. FIG. 10A is a cross-sectional view illustrating a case where the armature core is supported from the inside. FIG. 10B is a cross-sectional view illustrating a case where the armature core is supported from the outside. As the magnetic flux flows in the shortest path of the magnetic circuit, magnetic flux density is high on the inside of the C-shaped armature core 1 (a portion marked "i" in FIGS. 10A and 10B). Therefore, the tooth tops are inclined from the outside of the armature core 1 (a portion marked "o" in FIGS. 10A and 10B) to the inside, as shown in FIGS. 10A and 10B, so that the air gap on the "i" side is longer than the air gap on the "o" side.

The above configuration ensures that the overall magnetic flux distribution is uniform for the magnetic pole teeth 15. Inclining the tooth tops has the effect of decreasing the degree of magnetic flux bias and reducing torque ripple. The tooth tops need not always be entirely inclined. An alternative is to incline a limited portion of the tooth tops or cut the tooth tops into a circular shape. The above effect is obtained as far as the degree of magnetic flux concentration is reduced.

Figure 11:
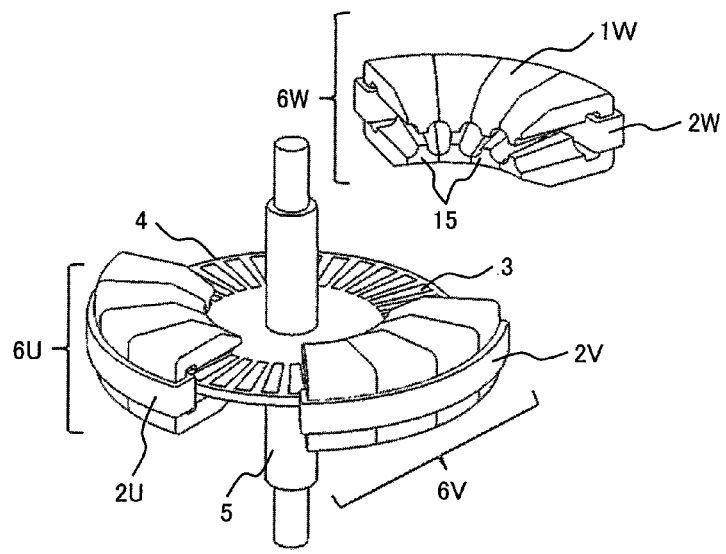
FIG. 11 is a diagram illustrating the shape of the armature core with a W-phase armature 6W removed.
Figure 12:
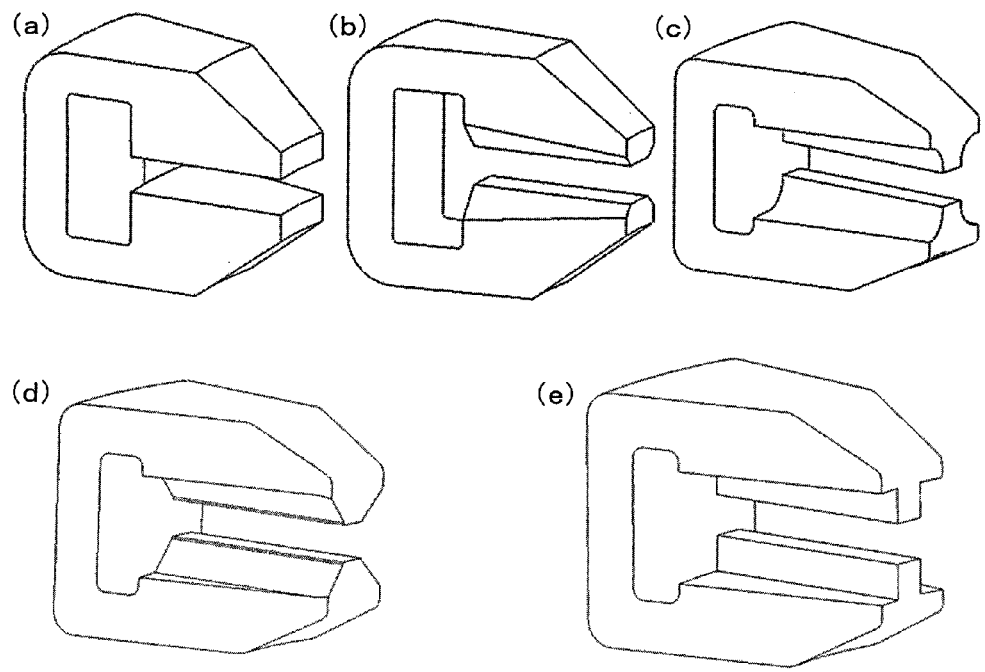
FIGS. 12A to 12E are diagrams illustrating various example shapes of the armature core.

FIG. 11 shows the rotary electrical machine in a three-phase configuration. In the example shown in FIG. 11, a W-phase armature 6W is removed in order to explain about the shape of the armature core 1. The magnetic flux of the armature core greatly varies with the shape of a magnet-opposing portion (magnetic pole tooth 15) of the armature core of each phase. Therefore, performance largely depends on the shape of a magnet-opposing portion of the armature core. In the example shown in FIG. 11, the shape of the armature's tooth top is rounded. Thinning the armature core toward the magnets on the rotor 4 provides the advantage of increasing the amount of effective magnetic flux and obtaining increased torque.

FIGS. 12A to 12E show various example shapes of the magnetic pole teeth 15 of the armature core 1. The examples shown particularly in FIGS. 12B to 12E indicate that the width of the magnetic pole teeth decreases toward the rotor, making it easy to cause the convergence of magnetic flux.

Figure 13:
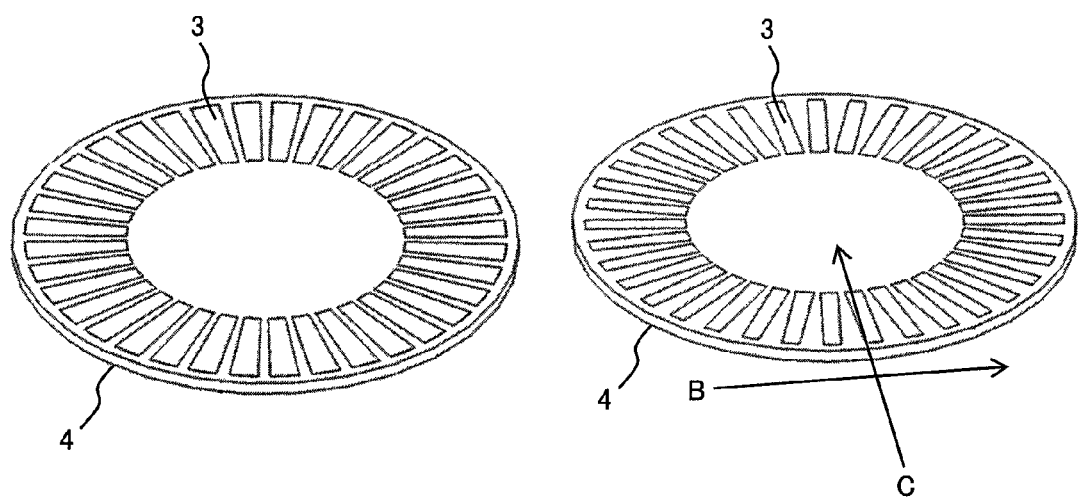
FIG. 13 is a set of diagrams illustrating example shapes of magnets disposed on the rotor 4.

FIG. 13 shows example shapes of magnets disposed on the rotor 4. The magnets shown in the left-hand drawing of FIG. 13 are shaped like a trapezoid whose width increases toward the outer circumference of the rotor 4. The magnets shown in the right-hand drawing of FIG. 13, on the other hand, are oblong in shape in consideration of the ease of magnet manufacture. It can be said that both of these two types of magnets are rectangular in shape. Plural rectangular magnets (including oblong, trapezoidal, many-sided, or substantially rhombic magnets) are arranged in the direction of arrow C, which crosses the direction of rotor rotation (arrow B in FIG. 1). The magnets are shaped like a rectangle whose longitudinal direction is the direction of arrow C. It goes without saying that magnetic flux leakage can be reduced when the magnetic pole teeth of the armature core 1 are shaped like a rectangle whose longitudinal direction is the direction of arrow C.

Figure 14:
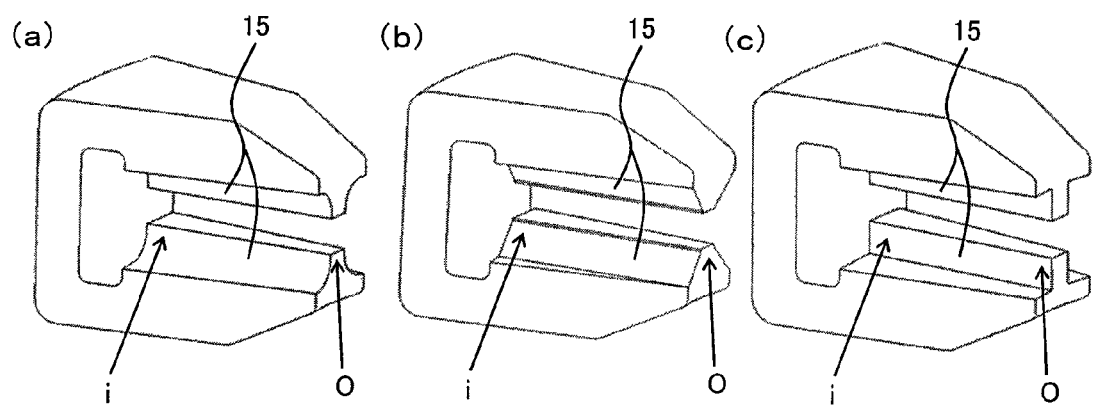
FIGS. 14A to 14C are diagrams illustrating examples of an armature core tooth top suitable for the shapes of magnets.

High torque can also be obtained by selecting a combination of an armature core tooth top shown in FIGS. 14A to 14C and a magnet shape shown in FIG. 13. When, for instance, an armature core tooth top shown in FIG. 14A, 14B, or 14C is selected while the trapezoidal magnets shown in the left-hand drawing of FIG. 13 are selected for the rotor, higher torque can be obtained. As regards the trapezoidal magnetic pole teeth 15 shown in FIGS. 14A to 14C, their inner end i is wider than their outer end o. When the leading-end shape of the armature is changed in this manner to match the shape of the magnets on the rotor, higher torque can be obtained.

Figure 15:
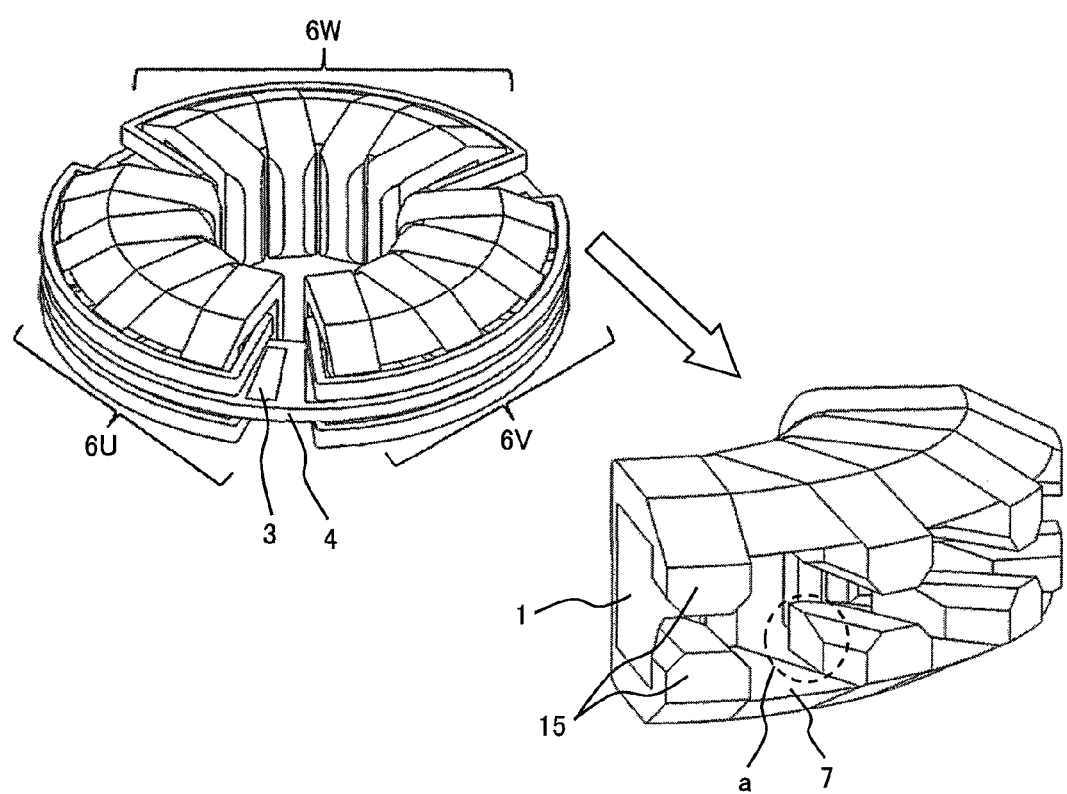
FIG. 15 shows an overall view of an internal support structure and a partially enlarged view of an example of the armature core 1.

FIG. 15 shows an overall view of a three-phase drive rotary electrical machine with an internal support structure and a partially enlarged view of an example of the armature core 1. As shown in the overall view, the disc-shaped rotor 4 is configured so that the intervals between the poles decrease toward the inner circumference. Therefore, magnetic flux leakage can be reduced by cropping the inner circumferential side a of a magnet-opposing portion of the armature core 1 as shown in the partially enlarged view. This makes it possible to obtain higher torque. When the inner circumferential side a is cropped as described above, it means that the magnetic pole teeth 15 are shaped to match the shape of magnets used in the internal support structure.

Figure 16:
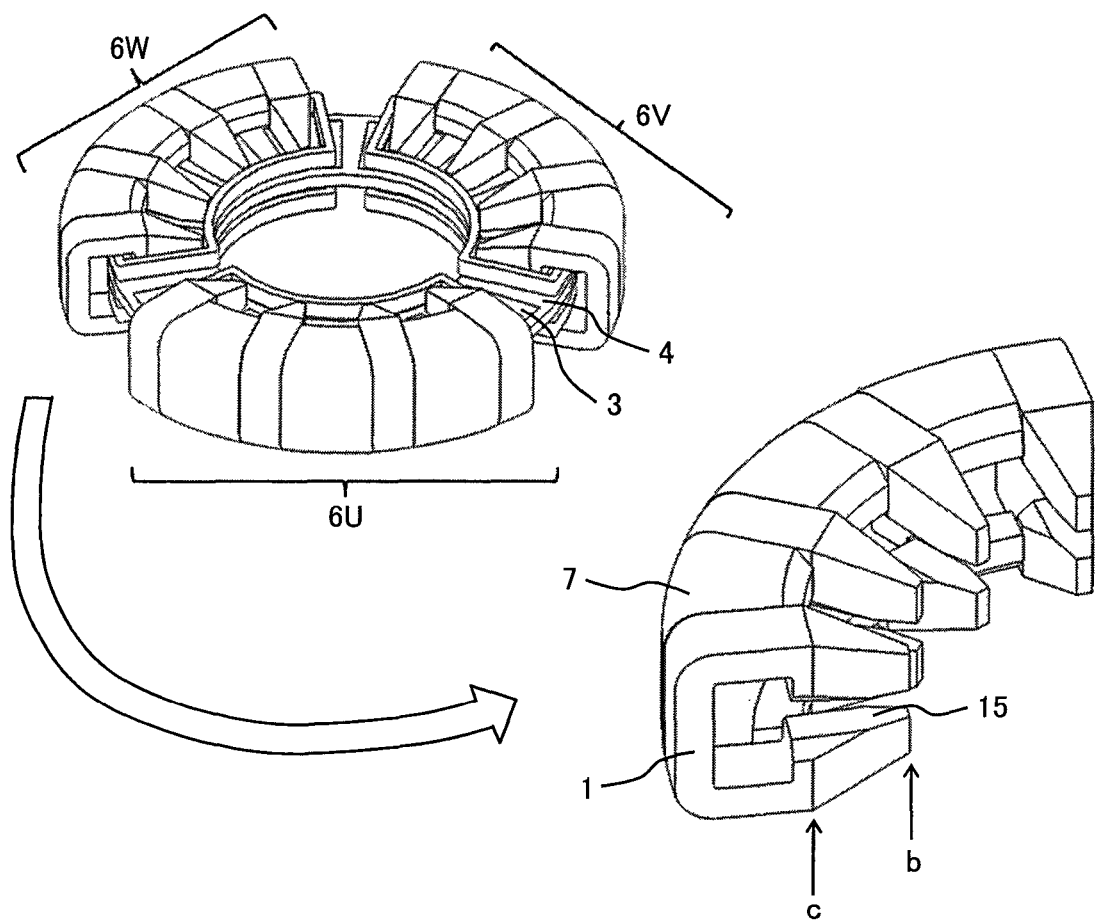
FIG. 16 shows an overall view of an external support structure and a partially enlarged view of an example of the armature core.

FIG. 16 shows an overall view of a three-phase drive rotary electrical machine with an external support structure and a partially enlarged view of an example of the armature core. Referring to the enlarged view in FIG. 16, the magnetic pole teeth 15 are configured so that the outer circumferential sides c of magnet-opposing portions of the armature core 1 are parallel to each other. However, the inner circumferential side b becomes thinner toward the inner circumference. The inner circumferential side b is configured in such a manner that ineffective magnetic flux will not be picked up when the spacing intervals between the magnets are decreased. When the inner circumferential side b is thinned as described above, it means that the magnetic pole teeth 15 are shaped to match the shape of magnets used in the external support structure.

Figure 17:
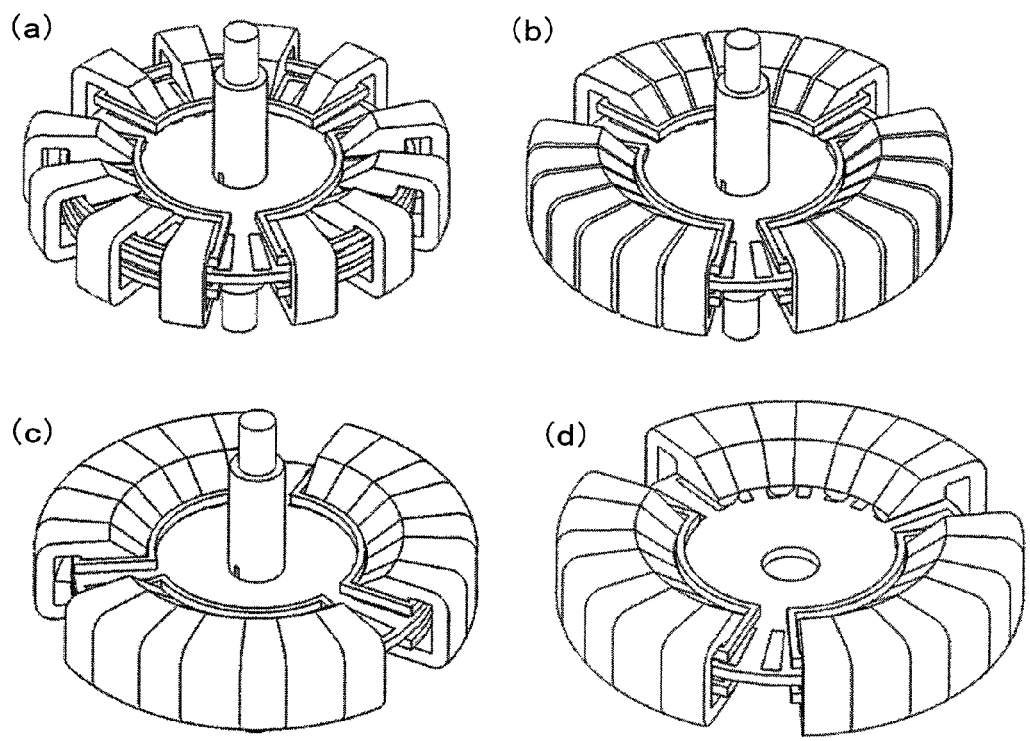
FIGS. 17A to 17D are diagrams illustrating various forms of the rotary electrical machine according to an embodiment of the present invention.

FIGS. 17A to 17D illustrate various forms of the rotary electrical machine according to an embodiment of the present invention. FIG. 17A shows an example of a three-phase rotary electrical machine in which each phase includes four poles. FIG. 17B shows an example in which an auxiliary core is added between the magnetic poles with an adjustment space provided between the auxiliary core and magnetic poles. FIG. 17C shows an example configuration in which the gaps between the auxiliary core and magnetic poles are filled. In FIG. 17D, the shaft and the winding for one phase are removed to clarify the structure of the tooth tops of an embodiment shown in FIG. 17C.

Figure 18:
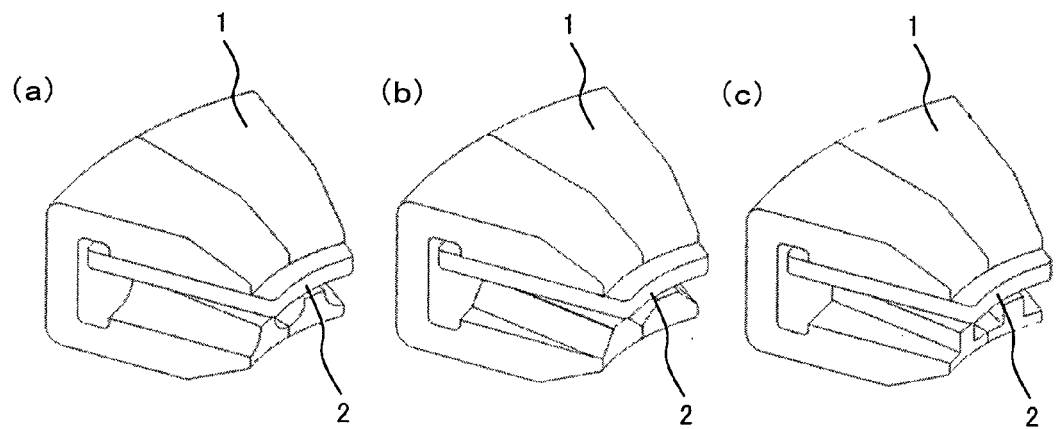
FIGS. 18A to 18C are diagrams illustrating winding arrangement examples according to an embodiment of the present invention.

FIGS. 18A to 18C illustrate winding arrangement examples according to an embodiment of the present invention. In FIGS. 18A to 18C, which depict three different shapes of the armature core, the lower winding is removed to clarify the shape of a tooth top. When the winding 2 is mounted on a portion from which the tooth top of the armature core 1 is removed, the winding 2 has no protrusion. This makes it possible to further reduce the size of the rotary electrical machine. This scheme also has the effect of providing winding protection and avoiding contact with a high-temperature winding.

Figure 19:
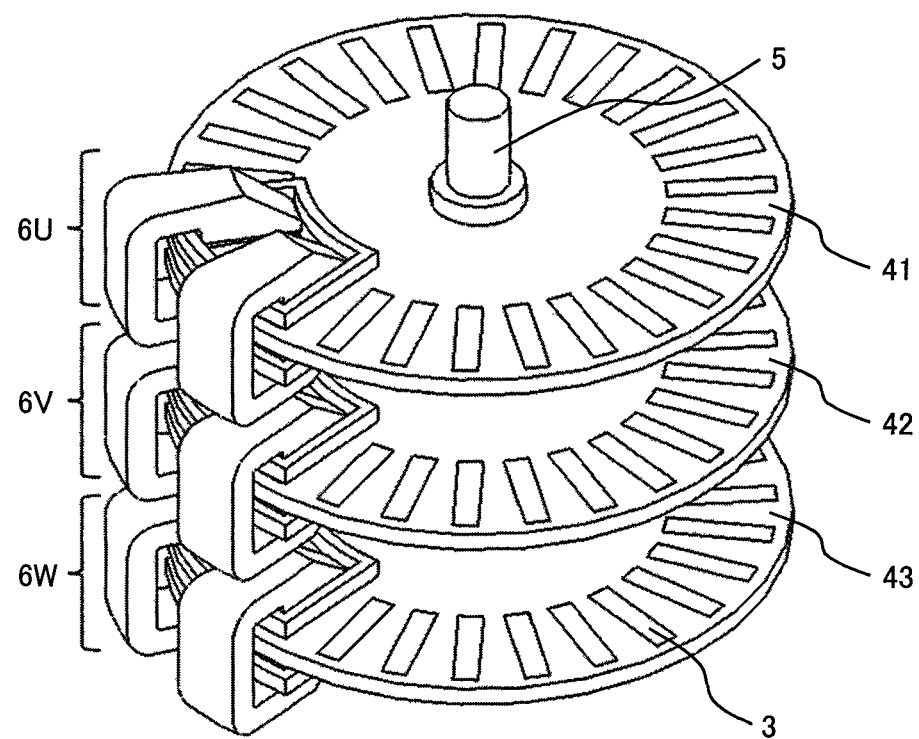
FIG. 19 is a diagram illustrating a three-layer configuration of the rotary electrical machine shown in FIG. 1.

FIG. 19 shows a three-layer configuration of the rotary electrical machine shown in FIG. 1. More specifically, three rotors 41, 42, 43 are installed over the shaft 5 and disposed in the height direction of the shaft. The armatures 6 of three different phases are provided respectively for the three rotors 4. In the example shown in FIG. 19, from top to bottom, the three layers are for the 6U, 6V, and 6W armatures. Although the example indicates that a two-pole armature core is provided for each rotor 41, 42, 43, any arbitrary armature arrangement may be employed. For example, an alternative is to provide one rotor with armatures of three different phases or intensively provide each rotor with armatures of different phases.

Figure 20:
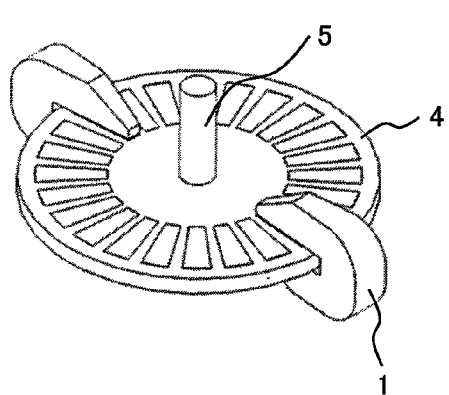
FIGS. 20A to 20D are diagrams illustrating various positional relationships between the rotor 4 and armature core.
Figure 20:
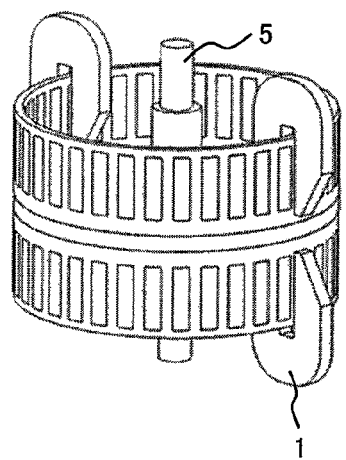
Figure 20:
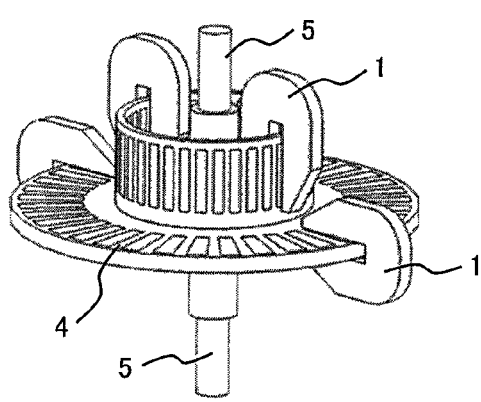
Figure 20:
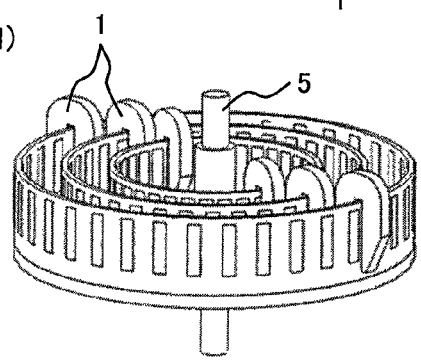

FIGS. 20A to 20D are diagrams illustrating various positional relationships between the rotor 4 and armature core. FIG. 20A shows a standard type in which the outer circumference of the disc-shaped rotor 4 is provided with the armature core 1. FIG. 20B shows a case where a cylindrical rotor 4 is employed. FIG. 20C shows a case where a disc-shaped rotor and a cylindrical rotor are combined. FIG. 20D shows a case where plural cylindrical rotors are disposed in a concentric manner. For the sake of brevity, FIGS. 20A to 20D assume that only one armature core is used.

Figure 21:
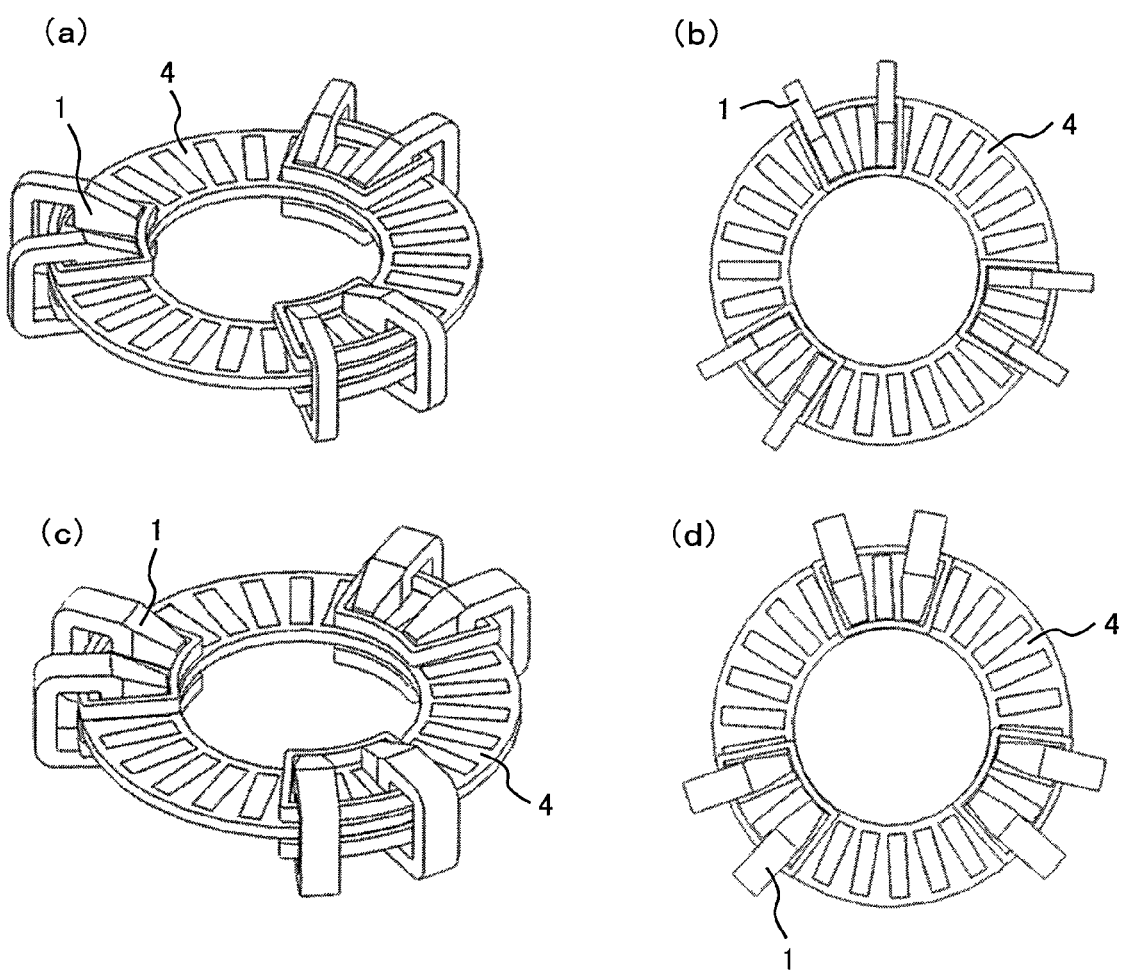
FIGS. 21A to 21D are diagrams illustrating different shapes of the armature.
Figure 22:
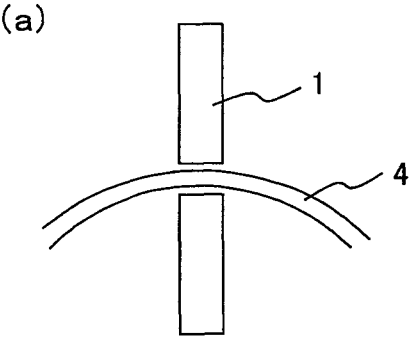
FIGS. 22A to 22D are diagrams illustrating example shapes of magnetic pole teeth.
Figure 22:
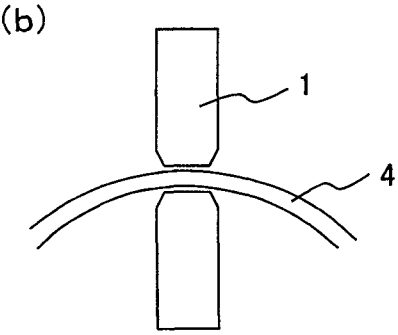
Figure 22:
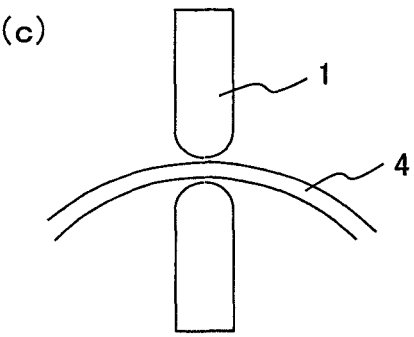
Figure 22:
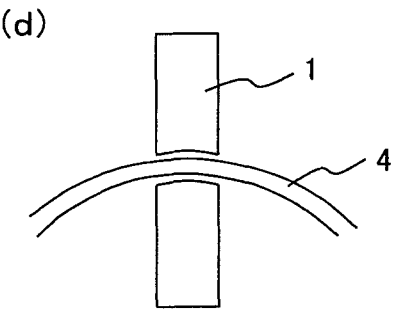

FIGS. 21A to 21D show examples in which different shapes of the armature core are employed. FIGS. 21A and 21B show an example configuration in which a linear armature core 1 is employed. FIGS. 21C and 21D show an example configuration in which the armature core 1 first varies in a linear manner and then becomes thinner toward the leading end of the armature core. Although the foregoing embodiments have been described in connection with some particular armature shapes, the shape of the armature is not limited to those described in connection with the foregoing embodiments.

FIGS. 22A to 22D show example shapes of magnetic pole teeth. These figures present schematic views of the armature core 1 taken from the bottom of a cylindrical rotor shown, for instance, in FIG. 20B. Characteristics can be controlled by changing the shape of the armature core or combining differently shaped armature cores as indicated in FIGS. 22A to 22D. The magnets to be disposed on the rotor may be, for example, arc-shaped to match the curved surface of a circular rotor 4 or shaped like a flat plate.

The foregoing embodiments have been described mainly in connection with three-phase drive. However, the rotary electrical machine can be driven without regard to the number of phases. The present invention is not limited to three-phase drive.

According to the embodiments of the present invention, magnetic flux leakage can be reduced to shorten the spacing intervals between the magnets. This makes it possible to obtain a high-torque rotary electrical machine. When the present invention is applied, for instance, to a rotary electrical machine for ships that require high torque even during low-speed rotation, it is possible to eliminate the need for a transmission or reduce its size. Therefore, the present invention is suitable for use on ships.

What is claimed is:

1. A rotary electrical machine comprising:
a rotor disc; and
an armature;
wherein the rotor disc is configured in such a manner that a plurality of rectangular magnets whose longitudinal direction is along a surface of the rotor disc and crosses the direction of rotation are disposed on the rotor disc, that the magnets disposed on the rotor disc are magnetized in the thickness direction of the rotor disc, and that the polarities of neighboring magnets differ from each other;
wherein the armature is configured in such a manner that a plurality of armature cores are disposed to sandwich the magnets on the rotor disc, that a winding is commonly wound between the armature cores, and that the plurality of armature cores commonly wound by the winding configure a phase; and
wherein, when the angle formed by the neighboring magnets on the rotor disc is θ and the symbol n represents an arbitrary harmonic number, the angle formed by the armature cores in the phase is $2\theta \pm \theta/n$.

2. The rotary electrical machine according to claim 1, wherein a plurality of the armatures are provided so as to configure multiple phases being electrically different from each other.

3. The rotary electrical machine according to claim 1, wherein a plurality of the armatures are provided so as to configure the three-phase rotary electrical machine.

4. A rotary electrical machine comprising:
a rotor disc; and
an armature;
wherein the rotor disc is configured in such a manner that a plurality of rectangular magnets whose longitudinal direction is along a surface of the rotor disc and crosses the direction of rotation are disposed on the rotor disc, that the magnets disposed on the rotor disc are magnetized in the thickness direction of the rotor disc, and that the polarities of neighboring magnets differ from each other;
wherein the armature is configured in such a manner that a plurality of armature cores are disposed to sandwich the magnets, which are mounted on the rotor disc and provided with a particular magnetic pole, and that a winding is commonly wound between the armature cores;
wherein the armature cores each include upper and lower magnetic pole teeth, which are respectively positioned above and below the rotor disc, and a core portion, which joins the upper and lower magnetic pole teeth, the magnetic pole teeth being formed in the longitudinal direction of the magnets,
wherein an air gap between the magnetic pole teeth and the magnets is configured in such a manner that the air gap formed by the leading ends of the magnetic pole teeth is smaller than the air gap formed by the core side of the magnetic pole teeth, and
wherein the magnetic pole teeth has surfaces facing the magnets and configured to be inclined with respect to the magnets.

5. The rotary electrical machine according to claim 4, wherein a portion of the magnetic pole teeth that is close to the magnets on the rotor disc is thin.

6. The rotary electrical machine according to claim 4, wherein the surfaces of the magnetic pole teeth that face the magnets are shaped to match the rectangular shapes of the magnets.

* * * * *